(12) United States Patent
Loussides et al.

(10) Patent No.: US 10,368,290 B2
(45) Date of Patent: Jul. 30, 2019

(54) COOPERATIVE COMMUNICATION LINK MAPPING AND CLASSIFICATION

(71) Applicant: Sikorsky Aircraft Corporation, Stratford, CT (US)

(72) Inventors: George Nicholas Loussides, Branford, CT (US); Michael Aaron Conner, Bridgeport, CT (US); Harshad S. Sane, Southbury, CT (US); Christopher Stathis, Hamden, CT (US); Garrett Pitcher, Cheshire, CT (US)

(73) Assignee: SIKORSKY AIRCRAFT CORPORATION, Stratford, CT (US)

(*) Notice: Subject to any disclaimer, the term of this patent is extended or adjusted under 35 U.S.C. 154(b) by 114 days.

(21) Appl. No.: 15/520,315

(22) PCT Filed: Oct. 27, 2015

(86) PCT No.: PCT/US2015/057570
§ 371 (c)(1),
(2) Date: Apr. 19, 2017

(87) PCT Pub. No.: WO2016/069593
PCT Pub. Date: May 6, 2016

(65) Prior Publication Data
US 2018/0302838 A1 Oct. 18, 2018

Related U.S. Application Data

(60) Provisional application No. 62/068,897, filed on Oct. 27, 2014.

(51) Int. Cl.
H04L 12/28 (2006.01)
H04W 40/24 (2009.01)
(Continued)

(52) U.S. Cl.
CPC ........ *H04W 40/246* (2013.01); *H04B 17/309* (2015.01); *H04W 16/18* (2013.01);
(Continued)

(58) Field of Classification Search
CPC ..................................................... H04L 12/28
(Continued)

(56) References Cited

U.S. PATENT DOCUMENTS 5,850,617 A 12/1998 Libby
7,480,866 B2 1/2009 Germain et al.
(Continued)

FOREIGN PATENT DOCUMENTS

WO 2010055602 A1 5/2010

OTHER PUBLICATIONS

International Search Report and Written Opinion of the International Searching Authority dated Jan. 21, 2016 in related PCT Application No. PCT/US2015/057570, 8 pages.
(Continued)

*Primary Examiner* — Dang T Ton
(74) *Attorney, Agent, or Firm* — Cantor Colburn LLP

(57) ABSTRACT

A method of cooperative communication link mapping and classification is provided. Location data are received defining a position of a communication node. Signal data of a communication link are monitored at the communication node with respect to a second communication node and characteristics of the signal data are identified. A location stamp of the position is applied to the characteristics of the signal data. The communication link is classified based on the characteristics of the signal data, and a map is populated classifying the communication link at the position indicated by the location stamp.

14 Claims, 4 Drawing Sheets

(51) Int. Cl.
*H04B 17/309* (2015.01)
*H04W 24/10* (2009.01)
*H04W 64/00* (2009.01)
*H04W 16/18* (2009.01)

(52) U.S. Cl.
CPC ......... *H04W 24/10* (2013.01); *H04W 64/006* (2013.01); *H04W 64/003* (2013.01)

(58) Field of Classification Search
USPC ........................................................ 370/329
See application file for complete search history.

(56) References Cited

U.S. PATENT DOCUMENTS

| | | | |
|---|---|---|---|
| 8,194,573 | B1 | 6/2012 | Smith et al. |
| 8,494,689 | B1 | 7/2013 | Ashton |
| 8,781,727 | B1 | 7/2014 | Bonawitz et al. |
| 8,879,426 | B1 | 11/2014 | Quilling et al. |
| 9,131,529 | B1 | 9/2015 | Ayyagari et al. |
| 9,137,847 | B1 | 9/2015 | Ayyagari et al. |
| 2003/0202468 | A1 | 10/2003 | Cain et al. |
| 2004/0030451 | A1 | 2/2004 | Solomon |
| 2004/0058652 | A1 | 3/2004 | McGregor et al. |
| 2005/0114551 | A1 | 5/2005 | Basu et al. |
| 2006/0211413 | A1 | 9/2006 | Aryur et al. |
| 2006/0235610 | A1 | 10/2006 | Aryur et al. |
| 2007/0168090 | A1 | 7/2007 | Demarco et al. |
| 2007/0253341 | A1 | 11/2007 | Atkinson et al. |
| 2007/0299794 | A1 | 12/2007 | El-Damhougy |
| 2007/0299946 | A1 | 12/2007 | El-Damhougy |
| 2007/0299947 | A1 | 12/2007 | El-Damhougy |
| 2010/0163914 | A1 | 7/2010 | Urano |
| 2010/0195520 | A1 | 8/2010 | Nakamura |
| 2011/0163914 | A1 | 7/2011 | Seymour |
| 2011/0267982 | A1 | 11/2011 | Zhang et al. |
| 2012/0059578 | A1 | 3/2012 | Venkatraman |
| 2012/0095651 | A1 | 4/2012 | Anderson |
| 2013/0238170 | A1 | 9/2013 | Klinger |
| 2013/0332075 | A1 | 12/2013 | Wang et al. |
| 2014/0010069 | A1 | 1/2014 | Abbasi et al. |
| 2014/0081505 | A1 | 3/2014 | Klinger et al. |
| 2014/0325257 | A1 | 10/2014 | Alfadhly et al. |
| 2015/0334768 | A1 | 11/2015 | Ranasinghe et al. |
| 2017/0111767 | A1 | 4/2017 | Xie et al. |
| 2018/0218734 | A1* | 8/2018 | Somech ................. G06Q 10/10 |

OTHER PUBLICATIONS

Yan, Yuan et al., "Co-Optimization of Communication and Motion Planning of a Robotic Operation in Fading Enironments," ECE Department, University of New Mexico, Albuquerque, NM 87113, retrieved from: http://www.ece.ucsb.edu/~ymostofi/papers/Asilomar11.pdf, 6 pages.

Esposito, Joel M. "Maintaining Wireless Connectivity Constraints for Robot Swarms in the Presence of Obstacles", Jouriral of Robotics, 2011, 12 pages (Year: 2011).

Pereira, Guilherme A. S., et al., "Decentralized motion planning for multiple robots subject to sensing and communication constraints" (2003), Departmental Papers (MEAM), 14 pages, http://repository.upenn.edu/mean_papers/45 (Year: 2003).

Taml, Cagatay et al., "Colloborative Mission Planning for UAV CLuster to Optimize Relay Distance", 2013 IEEE Aerospace Conference, Big Sky, MT, 2013, pp. 1-11 (Year: 2013).

Notification of Transmittal of the International Search Report for Application No. PCT/US2015/057576 dated Dec. 21, 2015; Mailed Jan. 21, 2016; 7 Pages.

Written Opinion of the International Searching Authority for Application No. PCT/US2015/057576 dated Dec. 21, 2015; Mailed Jan. 21, 2016; 5 Pages.

* cited by examiner

COOPERATIVE COMMUNICATION LINK MAPPING AND CLASSIFICATION

CROSS-REFERENCE TO RELATED APPLICATIONS

The present application is a 371 National Stage of International Patent Application No. PCT/US2015/057570, filed on Oct. 27, 2015, which claims priority to U.S. Provisional Application No. 62/068,897, filed on Oct. 27, 2014, the contents of which are incorporated herein by reference in their entirety.

BACKGROUND OF THE INVENTION

The subject matter disclosed herein generally relates to communication systems, and more particularly to cooperative communication link mapping and classification.

Communication systems that include mobile communication nodes can experience reduced performance and/or signal loss as one or more of the mobile communication nodes change position. Environmental factors and repositioning of obstacles that impair communication can also result in reduced communication system performance. Communication link accessibility between communication nodes may require a clear line of sight for optical or high-bandwidth communication. When one or more of the communication nodes are unmanned aerial vehicles (UAVs), a reduction or loss in communications can impede decision-making and planning capabilities. Maintaining communication between communication nodes, as well as predicting locations of reduced communication system performance can be challenging, especially in areas of heavy terrain or among urban canyons. Terrain maps can be useful in making navigation decisions, but they may not accurately reflect a wide range of impediments to communication system performance or current conditions of the area covered by the terrain maps.

BRIEF DESCRIPTION OF THE INVENTION

According to an aspect of the invention, a method of cooperative communication link mapping and classification is provided. Location data are received defining a position of a communication node. Signal data of a communication link are monitored at the communication node with respect to a second communication node, and characteristics of the signal data are identified. A location stamp of the position is applied to the characteristics of the signal data. The communication link is classified based on the characteristics of the signal data, and a map is populated classifying the communication link at the position indicated by the location stamp.

In addition to one or more of the features described above or below, or as an alternative, further embodiments could include comparing the characteristics of the signal data at the position over a period of time and classifying the communication link based on a gradient of the characteristics of the signal data at the position over the period of time.

In addition to one or more of the features described above or below, or as an alternative, further embodiments could include where the gradient defines a signal quality improvement, a signal quality reduction, or a signal quality rate of change.

In addition to one or more of the features described above or below, or as an alternative, further embodiments could include where the characteristics include one or more of: a data rate, a bit error rate, a signal strength, a noise level, and a signal-to-noise ratio.

In addition to one or more of the features described above or below, or as an alternative, further embodiments could include where the map further includes a time stamp for each update of the map.

In addition to one or more of the features described above or below, or as an alternative, further embodiments could include where the map further includes a vector of classifications of the communication link at the position covering a plurality of time stamps.

In addition to one or more of the features described above or below, or as an alternative, further embodiments could include where the map is a local communication link map, one or more communication link maps are received, and the local communication link map and the one or more received communication link maps are merged to form a communication link accessibility map covering a plurality of communication links and positions.

In addition to one or more of the features described above or below, or as an alternative, further embodiments could include tracking signal trends for each of the communication links relative to the positions.

In addition to one or more of the features described above or below, or as an alternative, further embodiments could include monitoring signal data of two or more communication links at the communication node with respect to the communication node and two or more communication nodes, populating the map with classifications of the two or more communication links, and updating the map based on a change of position of the communication node or a change detected in a characteristic of at least one of the two or more communication links.

In addition to one or more of the features described above or below, or as an alternative, further embodiments could include where the communication node is an unmanned aerial vehicle.

According to further aspects of the invention, a communication node of a cooperative communication link mapping and classification system is provided. The communication node includes a processor and memory having instructions stored thereon that, when executed by the processor, cause the communication node to receive location data defining a position of the communication node and monitor signal data of a communication link at the communication node with respect to a second communication node. Characteristics of the signal data are identified and a location stamp of the position is applied to the characteristics of the signal data. The communication link is classified based on the characteristics of the signal data, and a map is populated classifying the communication link at the position indicated by the location stamp.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

In exemplary embodiments, a cooperative communication link mapping and classification system can map communication link accessibility relative to one or more communication nodes. A communication node is an apparatus that includes a communication interface that receives a communication link from at least one other communication node. A communication link can be unidirectional or bidirectional. For example, a communication link can support two-way communication between a pair of communication nodes. Alternatively, a communication node may listen to communication broadcast by another communication node, such as listening to a radio or radar signal broadcast by another communication node. Communication nodes can be statically positioned or mobile. For instance, a communication node can be embodied in air, ground, and underwater vehicles, fixed ground stations, and portable communication systems (including cell phones & handheld radios). Communication nodes of various types can interact with each other, such as an unmanned aerial vehicle (UAV) establishing a communication link with one or more ground stations.

In an exemplary embodiment, communication link mapping and classification is performed by repeated comparisons of characteristics of currently received signal data of a communication link at a position of a communication node against one or more maps, where the position can be an index into the one or more maps. Characteristics of the signal data are identified, and a location stamp of the position of the communication node is applied. The communication link can be classified based on the characteristics of the signal data to define a signal quality level based on one or more threshold comparisons or weightings of the characteristics to classify the communication link as, for example, high quality (e.g., sufficiently high signal-to-noise ratio, low error rate), low quality (e.g., low signal-to-noise ratio, high error rate), or acceptable quality (e.g., mid-level values sufficient to achieve a reliable signal). Classification can also be performed on relative signal strength or other characteristics. Classifications may be defined with different levels of granularity depending upon system processing capabilities and precision needs. Communication link mapping and classification can also include tracking of signal trends over time and based on position changes. Each communication node that implements communication link mapping and classification can develop localized maps based on signal data for all observed links and exchange maps with other communication nodes to develop a more robust communication link accessibility map covering multiple communication links and positions.

Figure 1:
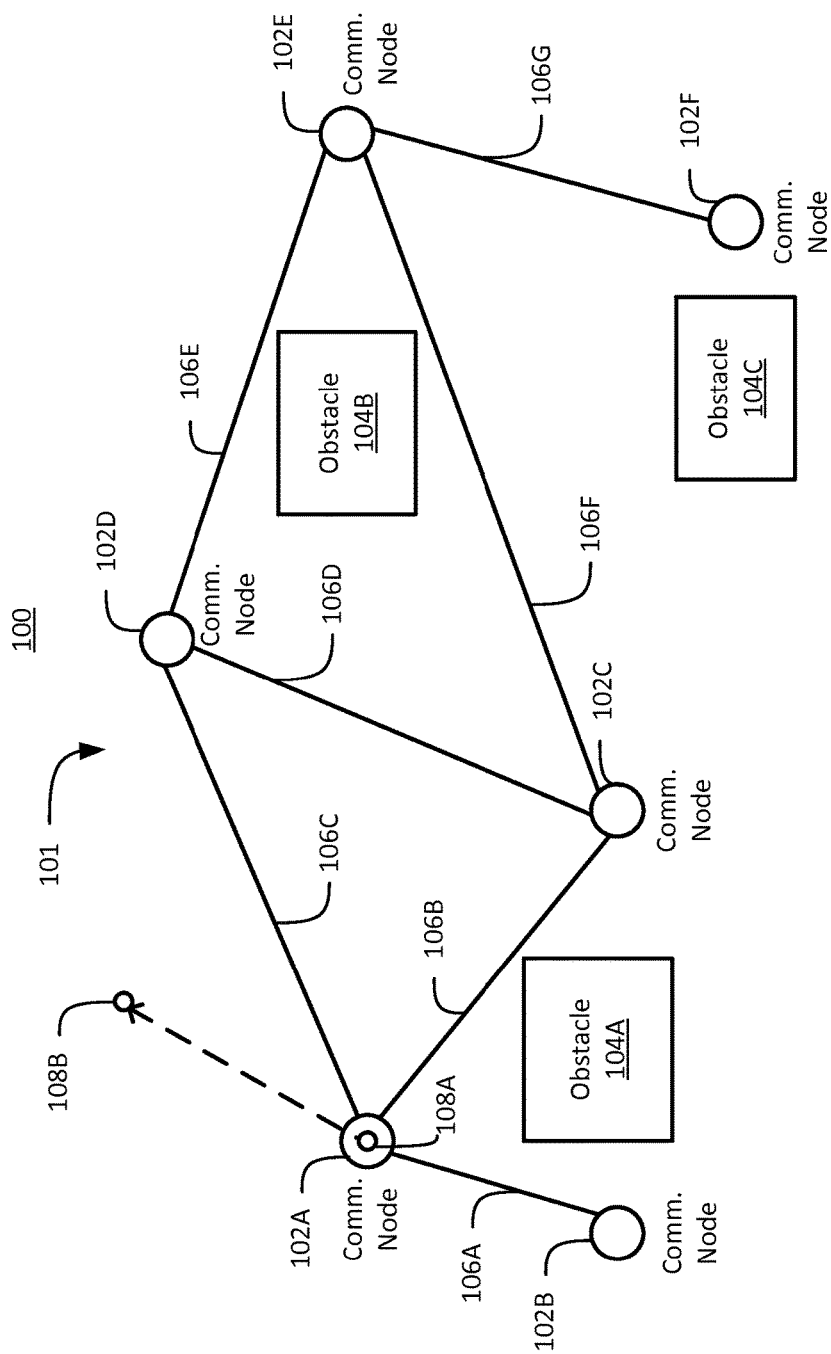
FIG. 1 schematically depicts a group of communication nodes in accordance with an embodiment.

FIG. 1 schematically depicts a first configuration 100 of a group 101 of communication nodes 102 in accordance with an embodiment. In the example of FIG. 1, a communication node 102A receives signal data directly from communication nodes 102B, 102C, and 102D. A number of obstacles that degrade or prevent communication may be present. Obstacles can include any physical objects that may obstruct communication between communication nodes 102, such as terrain or man-made objects that have their locations and dimensions documented within a map. Obstacle data in a map may be updated dynamically as new obstacles are discovered and/or characteristics of previously identified obstacles change. For example, in FIG. 1, obstacle 104A prevents direct communication between communication nodes 102B and 102C. Similarly, obstacle 104B prevents a communication link between communication nodes 102A and 102E. Obstacle 104C prevents a communication link between communication nodes 102A and 102F. The obstacles 104A, 104B, and 104C need not be physical obstacles but can be any impediment to communication, such as an area of high electromagnetic interference. In the example of FIG. 1, communication node 102A receives signal data from communication node 102B on communication link 106A, receives signal data from communication node 102C on communication link 106B, and receives signal data from communication node 102D on communication link 106C. A communication link 106D can be established between communication nodes 102C and 102D. In the first configuration 100, communication node 102E has a communication link 106E with respect to communication node 102D, communication link 106F with respect to communication node 102C, and communication link 106G with respect to communication node 102F.

At position 108A, communication node 102A monitors signal data of communication links 106A, 106B, and 106C. The communication node 102A can identify a number of characteristics, such as data rate, bit error rate, signal strength, noise level, and/or signal-to-noise ratio for signal data on the each of the communication links 106A, 106B, and 106C. The communication node 102A can also track communication frequencies, modes, and directional information relative to each of the communication links 106A, 106B, and 106C. A location stamp of the position 108A can be applied to the characteristics of the signal data for each of the communication links 106A, 106B, and 106C. Based on the expected communication characteristics for each of the communication links 106A, 106B, and 106C, the determined characteristics can be used to classify communication link quality of each of the communication links 106A, 106B, and 106C at position 108A. A time stamp can also be applied to form a vector of multiple iterations of characterization and classification at position 108A over a period of time. Communication node 102A can populate a map classifying the communication links 106A, 106B, and 106C at the position 108A, which can be indicated by a location stamp. Updates to the map can be made based on a change in position of the communication node 102A and/or a detected change in at least one of the characteristics of the communication links 106A, 106B, and 106C. A hysteresis band may be applied for change detection such that relatively small changes (e.g., <10%) do not trigger a map update.

For each of the communication nodes 102B-102F that performs cooperative communication link mapping and classification, similar maps can be developed for respective communication links and positions as described in reference to communication node 102A. The communication nodes 102A-102F can exchange maps with neighboring communication nodes such that each of the communication nodes 102A-102F may develop a communication link accessibility map that incorporates extended map data. For example, communication node 102D can receive a map from communication node 102E to learn about accessibility to communication node 102F associated with communication link 106G. Communication node 102A can learn about accessing communication node 102F from communication node 102D based on map data provided by communication node 102E. Communication node 102A can also learn about accessing communication node 102F from communication node 102C based on map data provided by communication node 102E. Communication node 102A need not be aware of the existence of obstacles 104A-104C nor the precise boundaries of obstacles 104A-104C; however, the communication node 102A can use direction information and position information from its local maps and received maps to determine where communication with other communication nodes may be improved or diminished. The received maps can also be used to communication routing decisions, such as selecting a preferred communication path for sending messages from communication node 102A to communication nodes 102E or 102F.

Figure 2:
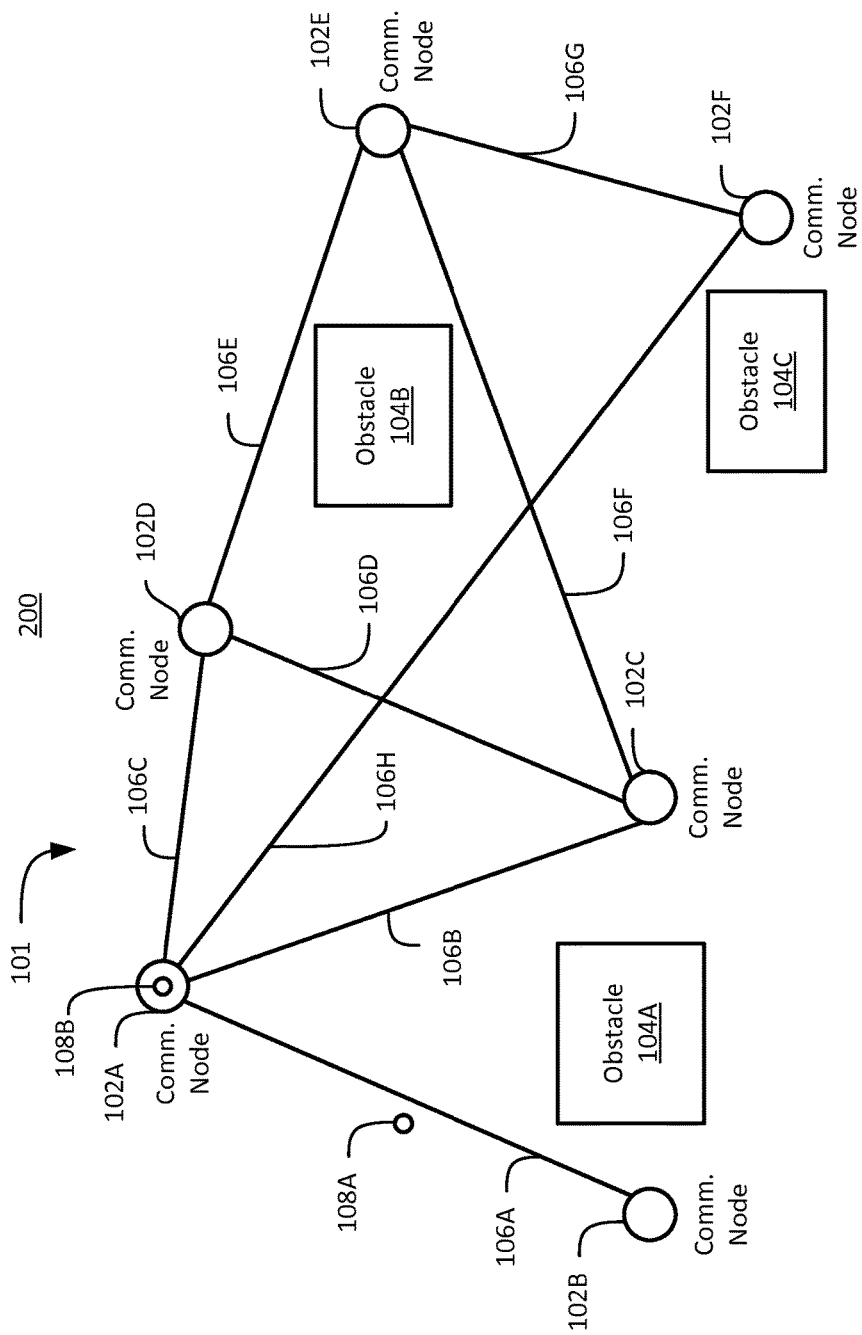
FIG. 2 schematically depicts a communication node position shift in accordance with an embodiment.

In one embodiment, communication node 102A is mobile and moves to various positions to further develop a communication link accessibility map. For instance, communication node 102A can move to position 108B, as further described in reference to FIG. 2. FIG. 2 schematically depicts a second configuration 200 of the group 101 of communication nodes 102 after communication node 102A shifts positions from position 108A to position 108B in accordance with an embodiment. Upon moving from position 108A to position 108B, communication node 102A may discover changes in characteristics of signal data received on communication links 106A, 106B, and 106C. For instance, an increased distance of communication links 106A and 106B may result in reduced signal quality characteristics, and a decreased distance of communication link 106C can result in improved signal quality characteristics. Thus, communication node 102A may classify communication link 106C as a higher quality communication link than communication link 106B, and select a path including communication links 106C and 106E rather than communication links 106B and 106F when attempting to communicate with communication node 102E. Communication node 102A may also discover that a communication link 106H can be established directly with respect to communication node 102F when communication node 102A is at position 108B.

Communication node 102A can compare the characteristics of the signal data at positions 108A and 108B over a period of time. Classification of each of the communication links 106A-106C and 106H can be based on a gradient of the characteristics of signal data at each of the positions 108A and 108B and/or between the positions 108A and 108B over a period of time. Gradient calculations can define a signal quality improvement, a signal quality reduction, or a signal quality rate of change. For example, signal quality of communication link 106A may change while the communication node 102A remains at position 108B, e.g., if communication node 102B moves behind obstacle 104A. A gradient of characteristics of signal data between the positions 108A and 108B can indicate improved or reduced signal quality per communication link. For instance, moving from position 108B back to position 108A results in a loss of communication link 106H due to obstacle 104C. Trend and gradient information can also be exchanged between communication nodes 102A-102F.

Figure 3:
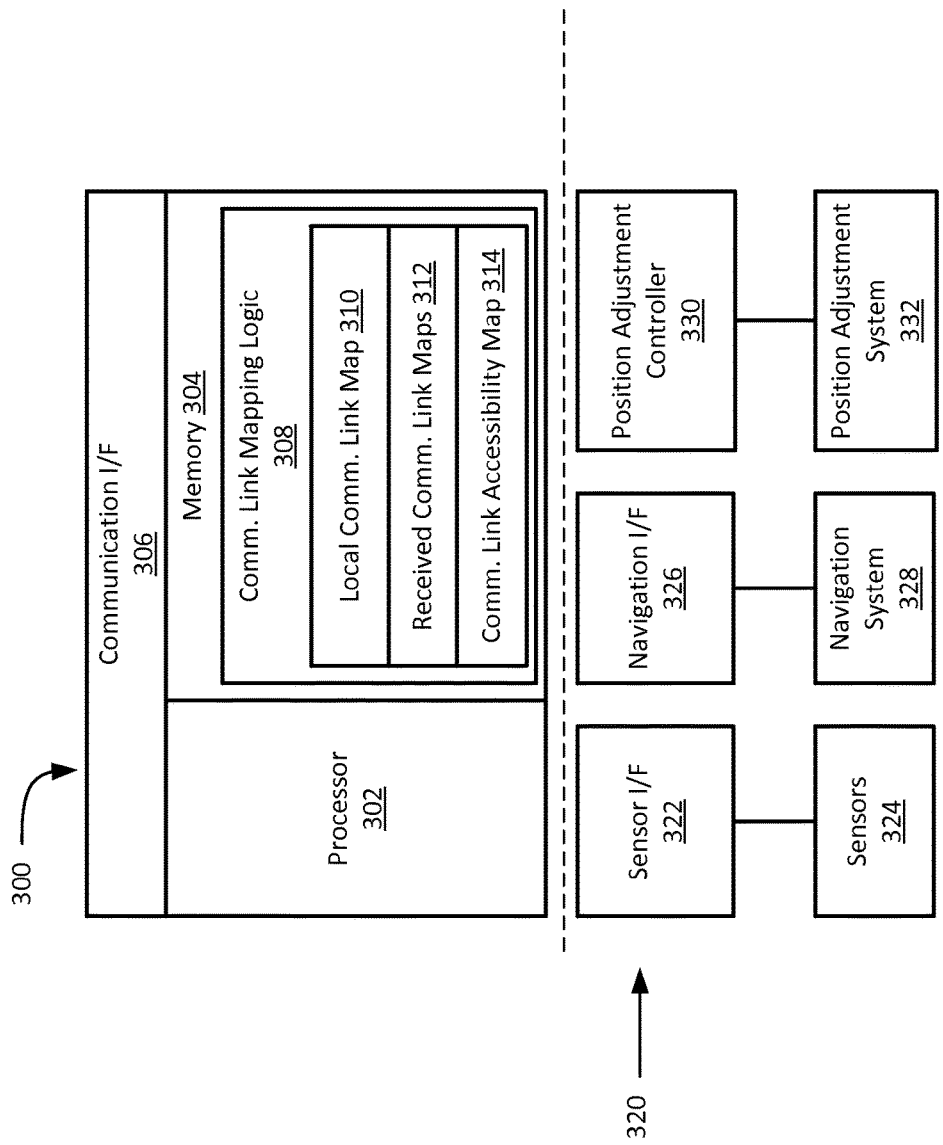
FIG. 3 schematically depicts a block diagram of a communication node of a cooperative communication link mapping and classification system in accordance with embodiments.

FIG. 3 schematically depicts a block diagram of a communication node 300 of a cooperative communication link mapping and classification system in accordance with embodiments. The communication node 300 can be embodied in one or more of the communication nodes 102A-102F of FIGS. 1 and 2. In some embodiments, at least one of the communication nodes 102A-102F of FIGS. 1 and 2 is an instance of the communication node 300 and one or more of the communication nodes 102A-102F of FIGS. 1 and 2 broadcast signal data but do not perform communication link mapping. In the example of FIG. 3, the communication node 300 includes a processor 302, memory 304, and a communication interface 306. The processor 302 can be any type or combination of computer processors, such as a microprocessor, microcontroller, digital signal processor, application specific integrated circuit, programmable logic device, and/or field programmable gate array. The memory 304 is an example of a non-transitory computer readable storage medium tangibly embodied in the communication node 300 including executable instructions stored therein, for instance, as firmware. Examples of instructions that can be stored in the memory 304 for execution by the processor 302 include communication link mapping logic 308.

The communication link mapping logic 308 can generate a local communication link map 310 and may receive one or more communication link maps as received communication link maps 312 from other instances of the communication node 300 via the communication interface 306. The communication link mapping logic 308 can merge the local communication link map 310 and the received communication link maps 312 to form a communication link accessibility map 314. Communication link accessibility data defined in the maps 310-314 can include a variety of location information and link data, including past and/or present values. The maps 310-314 can be formatted in various forms such as a visibility polygon region, a normalized or scaled link characteristic at each latitude-longitude-altitude location of interest, or other position based indexing technique. Link data can be a vector of communication frequencies, modes, gradients, classifications, and/or various characteristics to define communication type and quality. For directional-based communication protocols, direction information can also be stored in the maps 310-314 for respective communication links. The maps 310-314 can be layered in time to store a "live" version of the values in the maps 310-314 as the most recent (i.e., present) values and past values for gradient calculations, trending, and error checking.

A positioning and sensing subsystem 320 can include a sensor interface 322, a navigation interface 326, and/or position adjustment controller 330 as part of the communication node 300. In embodiments where the communication node 300 is a fixed position communication station, the positioning and sensing subsystem 320 may be omitted. In embodiments where the communication node 300 is at a fixed position and includes one or more sensors 324, the navigation interface 326 and the position adjustment controller 330 can be omitted. Examples of the sensors 324 can include perception sensors such as one or more video cameras, LIght Detection and Ranging scanners (LIDAR), LAser Detection and Ranging scanners (LADAR), RAdio Detection And Ranging (RADAR), and other sensor types known in the art. For mobile instances of the communication node 300, such as a UAV, ground vehicle, or marine vessel, the navigation interface 326 can receive location data defining a position from a navigation system 328, such as an inertial measurement unit (IMU), global positioning system (GPS), or the like. For mobile instances of the communication node 300, the position adjustment controller 330 can command movements of the communication node 300 using a position adjustment system 332, which may include engine controls, steering controls, flight controls and the like.

Figure 4:
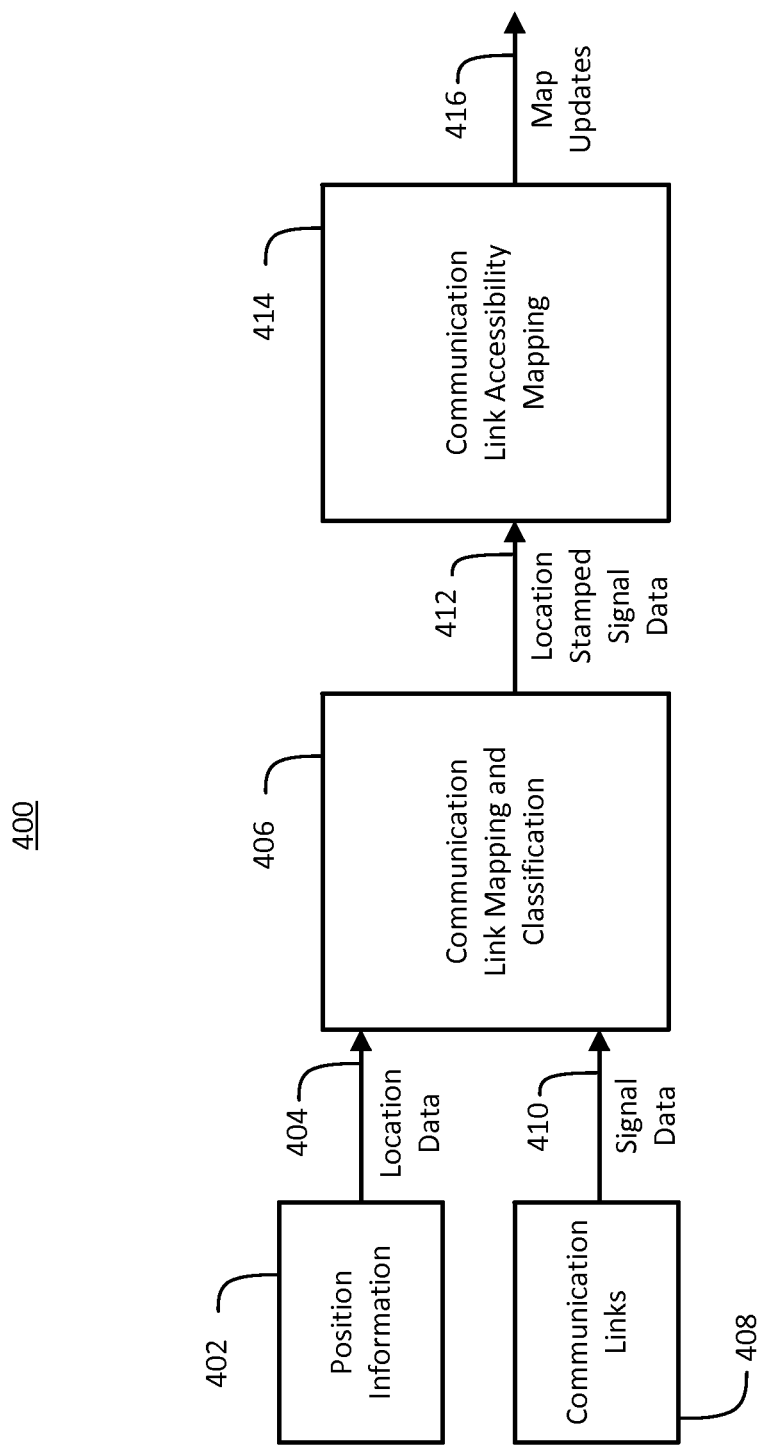
FIG. 4 schematically depicts a block diagram of data flow of a cooperative communication link mapping and classification system in accordance with embodiments.

FIG. 4 schematically depicts a block diagram of data flow 400 of a cooperative communication link mapping and classification system in accordance with embodiments. The data flow 400 can be implemented in the communication node 300 of FIG. 3 and one or more of the communication nodes 102A-102F of FIGS. 1 and 2. In the data flow 400, position information 402 provides location data 404 to communication link mapping and classification 406. The position information 402 can be determined by the navigation system 328 of FIG. 3. The position information 402 may be in formatted as rotation and acceleration parameters of the communication node 300 of FIG. 3 and converted to a geographic location in the location data 404. Communication links 408 provide signal data 410 to the communication link mapping and classification 406, for instance, via the communication interface 306 of FIG. 3. Examples of the communication links 408 include the communication links 106A, 106B, and 106C relative to communication node 102A of FIG. 1. The signal data 410 represent the data received on the communication links 408.

The communication link mapping logic 308 of FIG. 3 can implement the communication link mapping and classification 406 to identify characteristics of the signal data 410 and apply a location stamp of the position to the characteristics of the signal data 410 based on the location data 404 to produce location stamped signal data 412. The communication link mapping logic 308 of FIG. 3 may also implement communication link accessibility mapping 414 based on the location stamped signal data 412 to perform map updates 416. The communication link accessibility mapping 414 can classify each of the communication links 408 based on the characteristics of the signal data 410 and populate one or more maps, such as the local communication link map 310 and communication link accessibility map 314 of FIG. 3 at the position indicated by the location stamp from the location data 404. The communication link accessibility mapping 414 may also update the received communication link maps 312 and the communication link accessibility map 314 of FIG. 3 based on one or more communication link maps received from one or more other instances of the communication node 300 of FIG. 3.

Functionality can be distributed between the communication link mapping and classification 406 and the communication link accessibility mapping 414 of FIG. 4. For instance, either communication link mapping and classification 406 or the communication link accessibility mapping 414 can compare the characteristics of the signal data 410 at the position defined by the location data 404 over a period of time and classify one or more of the communication links 408 based on a gradient of the characteristics of the signal data 410 at the position over the period of time. A time stamp can be applied to each of the map updates 416, such that the maps 310-314 may include a vector of classifications of the communication links 408 at respective positions covering a multiple of time stamps. The communication link accessibility mapping 414 can also perform merging of the local communication link map 310 and the received communication link maps 312 to form the communication link accessibility map 314 of FIG. 3 covering the communication links 408 locally received and remotely received at associated positions. The map updates 416 can be triggered based on detecting a change of position of the communication node 300 of FIG. 3, a change detected in a characteristic of at least one of the communication links 408, or a change in remotely received data.

Technical effects include creating one or more communication link maps that classify communication links at multiple positions. Locally observed data can be exchanged with other communication nodes to form a larger-scale communication link accessibility map. Communication link maps can include derived data values, such as gradients associated with changes in time and/or changes in communication node position.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of cooperative communication link mapping and classification, the method comprising:
   receiving location data defining a position of a communication node;
   monitoring signal data of a communication link at the communication node with respect to a second communication node;
   identifying characteristics of the signal data;
   applying a location stamp of the position to the characteristics of the signal data;
   classifying the communication link based on the characteristics of the signal data; and
   populating a map classifying the communication link at the position indicated by the location stamp, wherein a time stamp is applied for each update of the map.

2. The method of claim 1, further comprising:
   comparing the characteristics of the signal data at the position over a period of time; and
   classifying the communication link based on a gradient of the characteristics of the signal data at the position over the period of time.

3. The method of claim 2, wherein the gradient defines a signal quality improvement, a signal quality reduction, or a signal quality rate of change.

4. The method of claim 1, wherein the characteristics include one or more of: a data rate, a bit error rate, a signal strength, a noise level, and a signal-to-noise ratio.

5. The method of claim 1, wherein the map further comprises a vector of classifications of the communication link at the position covering a plurality of time stamps.

6. The method of any of claim 1, wherein the map is a local communication link map and the method further comprises:
   receiving one or more communication link maps; and
   merging the local communication link map and the one or more received communication link maps to form a communication link accessibility map covering a plurality of communication links and positions.

7. The method of claim 6, further comprising:
   tracking signal trends for each of the communication links relative to the positions.

8. The method of claim 1, further comprising:
   monitoring signal data of two or more communication links at the communication node with respect to the communication node and two or more communication nodes;
   populating the map with classifications of the two or more communication links; and updating the map based on a change of position of the communication node or a change detected in a characteristic of at least one of the two or more communication links.

9. The method of claim 1, wherein the communication node is an unmanned aerial vehicle.

10. A communication node of a cooperative communication link mapping and classification system, the communication node comprising:
   a processor; and
   memory having instructions stored thereon that, when executed by the processor, cause the communication node to:
      receive location data defining a position of the communication node;
      monitor signal data of a communication link at the communication node with respect to a second communication node;
      identify characteristics of the signal data;
      apply a location stamp of the position to the characteristics of the signal data;
      classify the communication link based on the characteristics of the signal data;
      populate a map classifying the communication link at the position indicated by the location stamp; and
      applying a time stamp to each update of the map.

11. The communication node of claim 10, wherein the instructions further cause the communication node to:
   compare the characteristics of the signal data at the position over a period of time; and
   classify the communication link based on a gradient of the characteristics of the signal data at the position over the period of time.

12. The communication node of claim 10, wherein the map further comprises a vector of classifications of the communication link at the position covering a plurality of time stamps.

13. The communication node of claim 10, wherein the map is a local communication link map and the instructions further cause the communication node to:
   receive one or more communication link maps;
   merge the local communication link map and the one or more received communication link maps to form a communication link accessibility map covering a plurality of communication links and positions; and
   track signal trends for each of the communication links relative to the positions.

14. The communication node of claim 10, wherein the instructions further cause the communication node to:
   monitor signal data of two or more communication links at the communication node with respect to the communication node and two or more communication nodes;
   populate the map with classifications of the two or more communication links; and
   update the map based on a change of position of the communication node or a change detected in a characteristic of at least one of the two or more communication links.

* * * * *